United States Patent
Boebert et al.

[11] Patent Number: 5,822,435
[45] Date of Patent: Oct. 13, 1998

[54] TRUSTED PATH SUBSYSTEM FOR WORKSTATIONS

[75] Inventors: William E. Boebert, Minneapolis; Mark H. Hanson, Eagan; Thomas R. Markham, Anoka, all of Minn.

[73] Assignee: Secure Computing Corporation, Roseville, Minn.

[21] Appl. No.: 714,319

[22] Filed: Sep. 18, 1996

Related U.S. Application Data

[62] Division of Ser. No. 911,900, Jul. 10, 1992, Pat. No. 5,596,718.

[51] Int. Cl.⁶ ........................................................ H04L 9/00
[52] U.S. Cl. ................................................ 380/49; 380/4
[58] Field of Search ................................................ 380/4, 49

[56] References Cited

U.S. PATENT DOCUMENTS

| | | | |
|---|---|---|---|
| 4,352,952 | 10/1982 | Boone et al. | 178/22.09 |
| 4,365,249 | 12/1982 | Tabata | 340/825.3 |
| 4,368,357 | 1/1983 | Gurak | 179/1.5 R |
| 4,815,128 | 3/1989 | Malek | 380/9 |
| 4,817,147 | 3/1989 | Gorniak et al. | 380/49 |
| 4,922,534 | 5/1990 | Gorniak et al. | 380/49 |
| 4,981,371 | 1/1991 | Gurak et al. | 380/49 |
| 4,985,919 | 1/1991 | Naruse et al. | 380/18 |
| 4,989,244 | 1/1991 | Naruse et al. | 380/20 |
| 5,001,750 | 3/1991 | Kato et al. | 380/18 |
| 5,062,136 | 10/1991 | Gattis et al. | 380/18 |
| 5,166,977 | 11/1992 | Ross | 380/18 |
| 5,228,083 | 7/1993 | Lozowick et al. | 380/9 |
| 5,241,596 | 8/1993 | Negi | 380/18 |
| 5,276,735 | 1/1994 | Boebert et al. | 380/21 |
| 5,280,529 | 1/1994 | Nost | 380/49 |
| 5,341,427 | 8/1994 | Hardy et al. | 380/21 |
| 5,351,136 | 9/1994 | Wu et al. | 358/440 |
| 5,410,599 | 4/1995 | Crowley et al. | 380/9 |
| 5,430,800 | 7/1995 | Miura | 380/18 |

*Primary Examiner*—Thomas H. Tarcza
*Assistant Examiner*—Hrayr A. Sayadian
*Attorney, Agent, or Firm*—Schwegman, Lundberg, Woessner, and Kluth, P.A.

[57] ABSTRACT

A method and apparatus for ensuring secure communication over an unsecured communications medium between a user working on an unsecured workstation or computer and a host computer. A secure user interface is created by inserting a trusted path subsystem between input/output devices to the workstation and the workstation itself. Data transferred from the input/output devices is intercepted, encrypted and transmitted in packets to the host computer. Packets of screen display data from the host computer are decrypted and presented within a user-defined screen overlay.

14 Claims, 6 Drawing Sheets

TRUSTED PATH SUBSYSTEM FOR WORKSTATIONS

This is a division of application Ser. No. 07/911,900, filed Jul. 10, 1992, now U.S. Pat. No. 5,596,718.

BACKGROUND OF THE INVENTION

1. Field of the Invention

The present invention relates to an apparatus and method for providing a trusted computer system based on untrusted computers, and more particularly to an apparatus and method for providing a trusted path mechanism between a user node based on an untrusted computer or workstation and a trusted subsystem.

2. Background Information

Advances in computer and communications technology have increased the free flow of information within networked computer systems. While a boon to many, such a free flow of information can be disastrous to those systems which process sensitive or classified information. In response to this threat, trusted computing systems have been proposed for limiting access to classified information to those who have a sufficient level of clearance. Such systems depend on identifying the user, authenticating (through password, biometrics, etc.) the user's identity and limiting that user's access to files to those files over which he or she has access rights. In addition, a trusted path mechanism is provided which guarantees that a communication path established between the Trusted Computer Base (TCB) and the user cannot be emulated or listened to by malicious hardware or software. Such a system is described in U.S. Pat. Nos. 4,621,321; 4,713,753; and 4,701,840 granted to Boebert et al. and assigned to the present assignee, the entire disclosures of which are hereby incorporated by reference.

The last decade has marked a shift in the distributing of computational resources. Instead of connecting a large number of relatively "dumb" terminals to a mainframe computer, the automatic data processing environment has gradually shifted to where a large number of current systems are file server systems. In a file server system, relatively low cost computers are placed at each user's desk while printers and high capacity data storage devices are located near the server or servers. Files stored in the high capacity data storage devices are transferred to the user's computer for processing and then either saved in local storage or transferred back to the storage devices. Documents to be printed are transferred as files to a print server; the print server then manages the printing of the document.

An even more loosely coupled distributed computing approach is based on the client-server paradigm. Under the client-server paradigm, one or more client processes operating on a user's workstation gain access to one or more server processes operating on the network. As in file server systems, the client processes handle the user interface while the server processes handle storage and printing of files. In contrast with file server systems, however, the client processes and the server processes share data processing responsibilities. A more complete discussion of distributed computing is contained in "Client-Server Computing" by Alok Sinha, published in the July 1992 issue of *Communications of the ACM*.

Both the file server and the client-server paradigms depend heavily upon the availability of low-cost computer systems which can be placed at each user's desk. The low-cost systems are then connected through a network such as a LAN or a WAN to the server systems. Such a networked system is illustrated in the block diagram shown in FIG. 1.

In FIG. 1, a workstation processing unit 40 is connected through a network 50 to a host computer 60. Workstation unit 40 is also connected through video port 44 and keyboard port 46 to display unit 10 and keyboard 20, respectively.

In a typical distributed computer system, the workstations 40, the host computers 60 and the connecting networks 50 are all at great risk of a security breach. Trusted computer systems based on host computers such as the Multilevel Secure (MLS) Computer 60 shown in FIG. 1 make security breaches at the host computer more difficult by partitioning the system to isolate security critical (trusted) subsystems from nonsecurity critical (untrusted) subsystems. Such computers do little, however, to prevent security breaches on network 50 or at user workstation 40.

A Multi-Level Secure (MLS) Computer such as is shown in FIG. 1 is capable of recognizing data of varying sensitivity and users of varying authorizations and ensuring that users gain access to only that data to which they are authorized. For example, an MLS computer can recognize the difference between company proprietary and public data. It can also distinguish between users who are company employees and those who are customers. The MLS computer can therefore be used to ensure that company proprietary data is available only to users who are company employees.

Designers of MLS computers assume that unauthorized individuals will use a variety of means, such as malicious code and active and passive wiretaps, to circumvent its controls. The trusted subsystem of an MLS computer must therefore be designed to withstand malicious software executing on the untrusted subsystem, to confine the actions of malicious software and render them harmless. One mechanism for avoiding malicious software is to invoke a trusted path, a secure communications path between the user and the trusted subsystem. A properly designed trusted path ensures that information viewed or sent to the trusted subsystem is not copied or modified along the way.

Extension of the trusted path through the network to the user is, however, difficult. As is described in a previously filed, commonly owned U.S. patent application entitled "Secure Computer Interface" (U.S. Pat. No. 5,272,754, issued Dec. 21, 1993 to William E. Boebert), "active" and "passive" network attacks can be used to breach network security. Active attacks are those in which masquerading "imposter" hardware or software is inserted into the network communications link. For example, hardware might be inserted that emulates a user with extensive access privileges in order to access sensitive information. "Passive" network attacks include those in which a device listens to data on the link, copies that data and sends it to another user. A system for ensuring secure data communications over an unsecured network is described in the above-identified patent. That patent is hereby incorporated by reference.

Active and passive attacks can also be used to breach computer security through software running on an untrusted user computer, an untrusted host or in the untrusted subsystem of a Multilevel Secure Computer. For example, malicious software running in the workstation could present itself to an authorized user as the trusted subsystem, and cause that user to enter highly sensitive data, such as a password. The data is then captured and given to the attacker. Under a passive software attack, data which is intended for one user could be copied and sent to a user who is not authorized to work with it.

Systems for ensuring secure communications over an unsecured network have been limited to date to scrambling devices which encrypt data written to the network and decrypt data received from the network. Such systems are limited in that they provide no assurance that the user's computer is secure or that the user has, in fact, established a trusted path to the trusted subsystem. Therefore, despite the fact that the communications link is secure, it is possible for a user on the computer to be misled into believing that a program executing on his computer is actually running on the host computer.

What is needed is a mechanism for extending the trusted path from the trusted subsystem of the host computer to the user of an untrusted computer or workstation. Such a method should provide access to the workstation for normal workstation activities while shielding confidential data so that it cannot be read by software executing on the unsecured workstation.

SUMMARY OF THE INVENTION

The present invention provides a method and apparatus for ensuring secure communication over an unsecured communications medium between a user working on an unsecured workstation or computer and a host computer. A secure user interface is created by inserting a trusted path subsystem between input/output devices to the workstation and the workstation itself. Data transferred from the input/output devices is intercepted, encrypted and transmitted in packets to the host computer. Packets of screen display data from the host computer are decrypted and presented within a user-defined screen overlay.

According to another aspect of the present invention, a method is disclosed for ensuring secure file transfers between an unsecured workstation and a host computer. A file to be transferred is downloaded to a trusted path subsystem inserted between the workstation and its keyboard and display device. The trusted path subsystem presents a representation of the file on the display device where the user can verify that the file is as expected. The verified file is then encrypted and transferred as packets to the host computer.

DETAILED DESCRIPTION OF THE PREFERRED EMBODIMENTS

In the following Detailed Description of the Preferred Embodiments, reference is made to the accompanying Drawings which form a part hereof, and in which are shown by way of illustration specific embodiments in which the invention may be practiced. It is to be understood that other embodiments may be utilized and structural changes may be made without departing from the scope of the present invention.

The present invention provides a method and apparatus for ensuring secure communication over an unsecured communications medium between a user working on an unsecured workstation or computer and a host computer. A secure user interface is created by inserting a trusted path subsystem between input/output devices to the workstation and the workstation itself. Data transferred from the input/output devices is intercepted, encrypted and transmitted in packets through the workstation to the host computer. Packets of screen display data from the host computer are decrypted and presented within a user-defined screen overlay.

Cryptographic entities in the trusted path subsystem and the host computer apply end-to-end encryption to confidential data transferred to and from the network. End-to-end encryption is a technique whereby data is encrypted as close to its source as possible and decrypted only at its ultimate destination. This technique differs from link encryption, in which data is decrypted, then encrypted again as it moves from the sender to the receiver.

The present invention extends the notion of end-to-end encryption by performing the encryption/decryption closer to the originator and receiver than prior systems. In the present invention, the encryption/decryption is performed as the data enters and leaves the input/output device. The data is therefore protected from malicious software which might be operating on the workstation and from active or passive attacks on the network.

Figure 1:
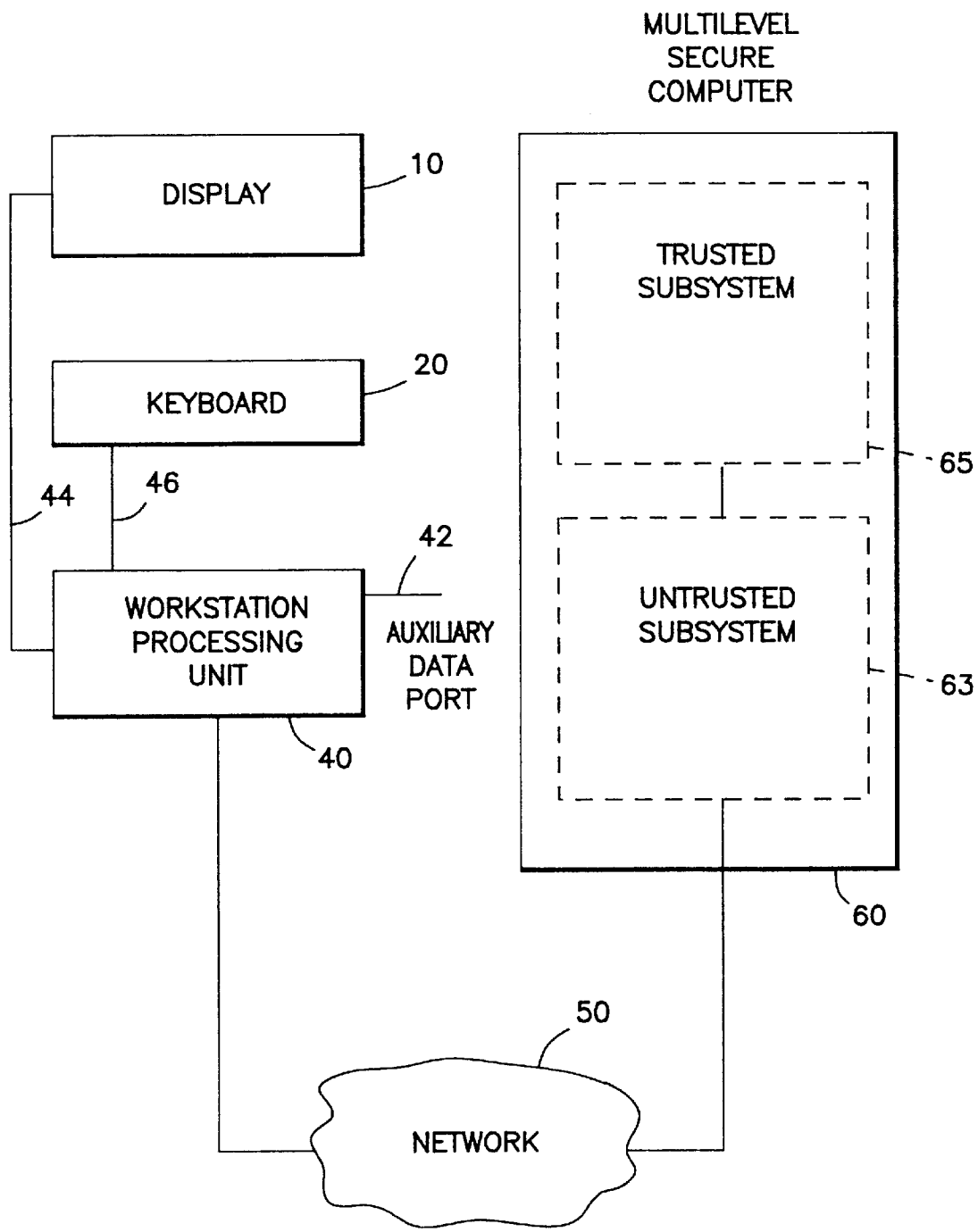
FIG. 1 is a system level block diagram representation of a networked computer system.
Figure 2:
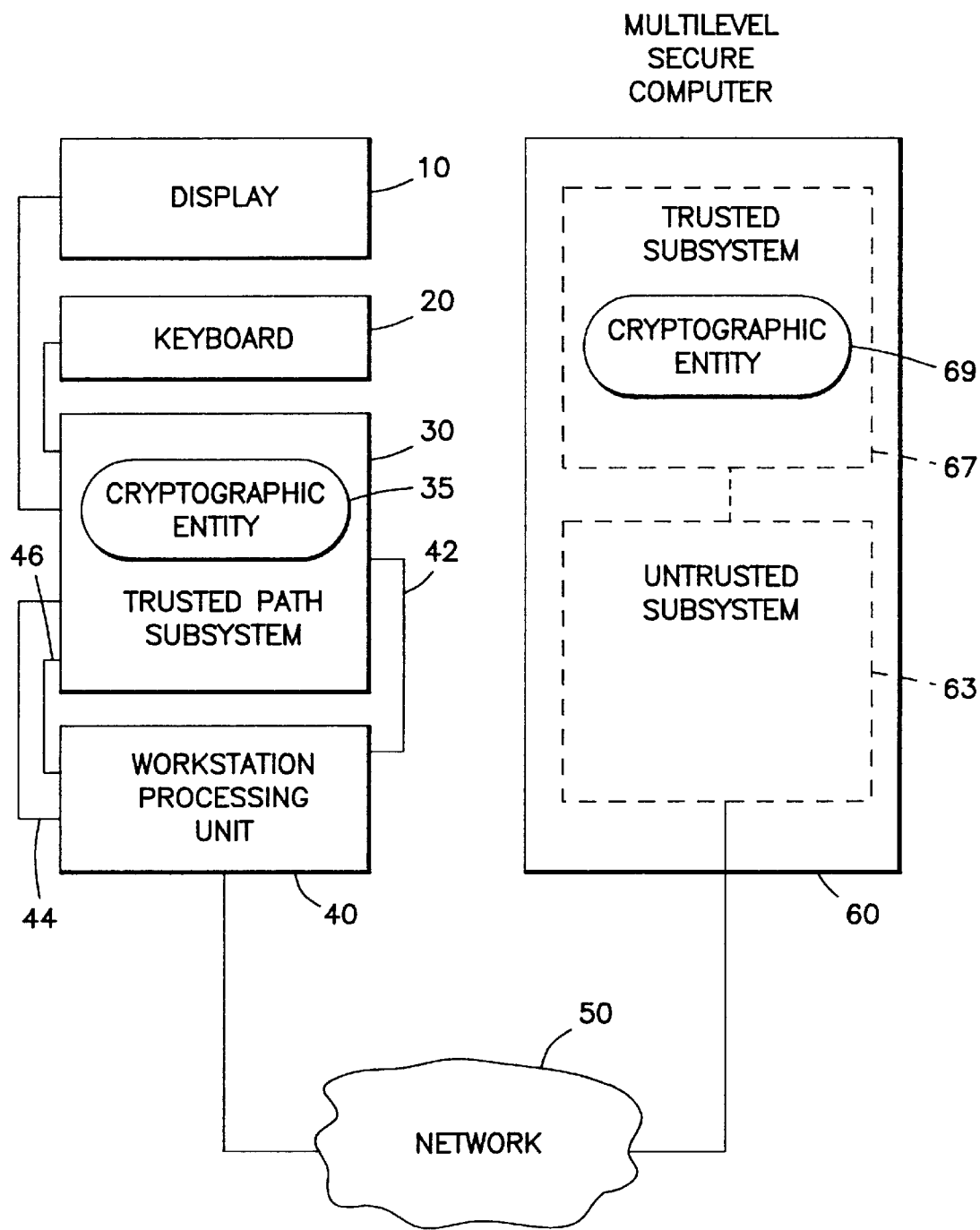
FIG. 2 is a system level block diagram representation of a secure networked computer system according to the present invention.

A secure networked computer system constructed according to the present invention is illustrated generally in FIG. 2. In FIG. 2, a workstation processing unit 40 is connected through a network 50 to a host computer 60. Workstation 40 can be any computer, workstation or X terminal which has a separate data path for communication between a trusted path subsystem 30 and the workstation. For instance, workstation 40 can be a commercially available workstation such as the UNIX workstations manufactured by Sun Microsystems, Mountain View, Calif., an IBM PC compatible such as those available from Compaq, Houston, Tex. or an X terminal such as Model NCD19g from Network Computing Devices, Inc, Mountain View, Calif.

Trusted path subsystem 30 is connected to workstation 40 (through auxiliary data port 42), keyboard 20 and display 10. Trusted path subsystem 30 includes cryptographic entity 35 for encrypting and decrypting information transferred between display 10, keyboard 20 and workstation 40.

Host computer 60 is a Multi-Level Secure computer which includes a trusted subsystem 67 and an untrusted subsystem 63. Trusted subsystem 67 includes a cryptographic entity 69 for encrypting and decrypting data transferred between trusted subsystem 67., untrusted subsystem 63, and network 50. In another embodiment of the present invention, host computer 60 is a computer running a trusted subsystem software package. In that embodiment, cryptographic entity 69 would be implemented in software.

In the embodiment shown in FIG. 2, all communication between trusted path subsystem 30 and host computer 60 is done via workstation 40. In one such embodiment, auxiliary data port 42 is an RS-232 line connecting workstation 40 and subsystem 30. Communications software running on workstation 40 receives encrypted packets from the trusted path subsystem and sends them to the host computer. In a like manner, encrypted packets from host computer 60 are received by workstation 40 and transferred to subsystem 30 for decrypting. This type of interface is advantageous since a standard communications protocol can be defined for transfers between subsystem 30 and host computer 60. Workstation 40 then implements the standard protocol for the communications media connecting it to host computer 60.

Network 50 can be implemented in a wide range of communications protocols, from FDDI to a simple telecommunications line between two modems. In a network implementation, subsystem 30 provides only the encrypted file; workstation 40 provides the layers of protocol needed for reliable communication on network 50.

Figure 3:
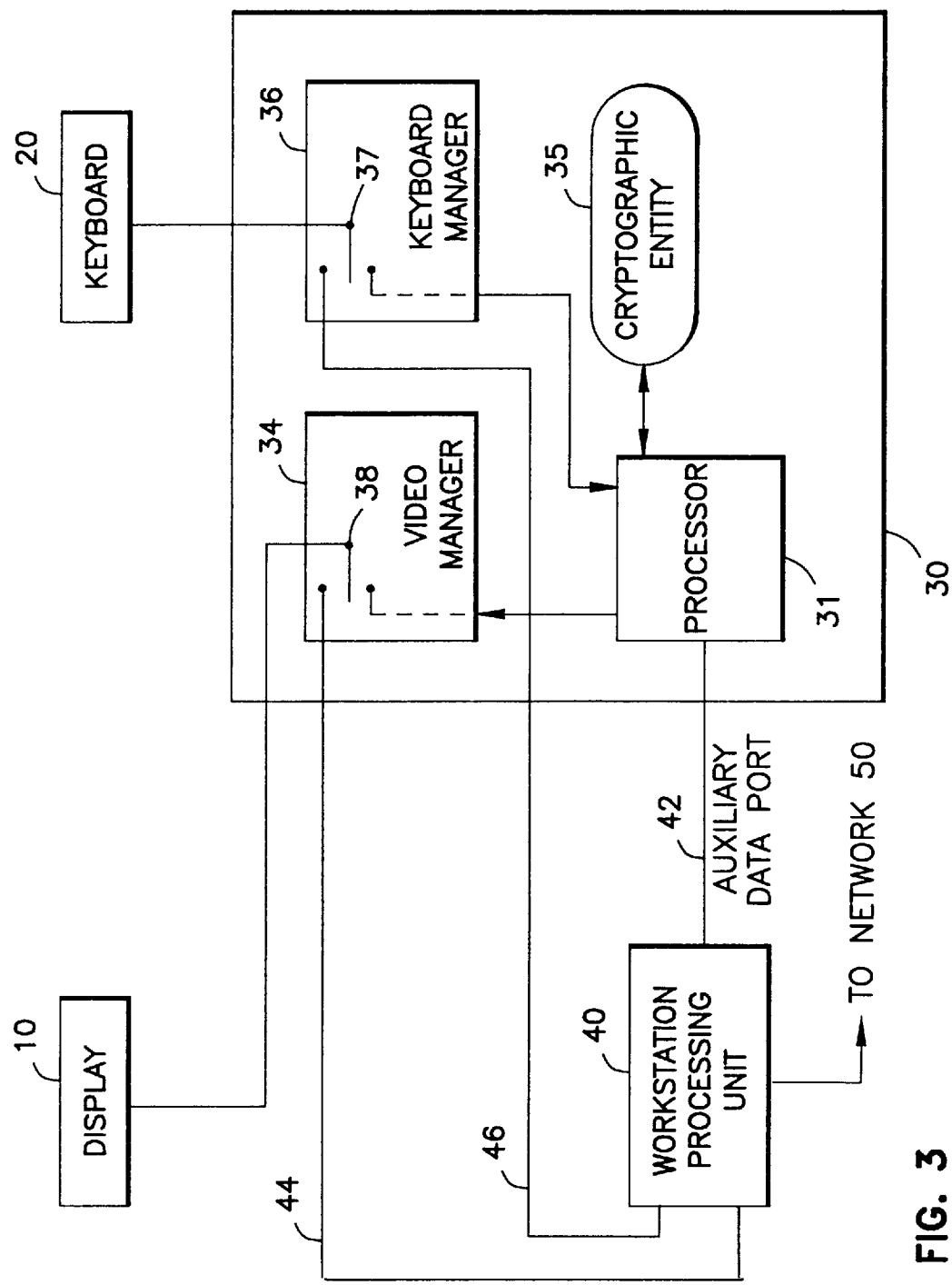
FIG. 3 is a block diagram representation of a user node including a trusted path subsystem according to the present invention.

FIG. 3 provides more detail of trusted path subsystem 30. Trusted path subsystem 30 consists of a processor 31 connected to a keyboard manager 36, a video manager 34 and cryptographic entity 35. Trusted path subsystem 30 operates in normal mode and in trusted path mode. When in normal mode, workstation trusted path subsystem 30 is transparent to workstation 40. Logical switches 37 and 38 are in the UP position, connecting workstation processor 40 directly to keyboard 20 and display 10. This permits the free transfer of information from keyboard 20 to workstation 40 and from workstation 40 to display 10. In normal mode, workstation processor 40 runs software and communicates with host computer 60 via network 50.

When the user invokes trusted path mode, however, workstation processor 40 is disconnected from keyboard 20 and display 10 by logical switches 37 and 38, respectively. Keyboard 20 and display 10 are then connected to their respective managers in workstation trusted path subsystem 30.

Figure 6:
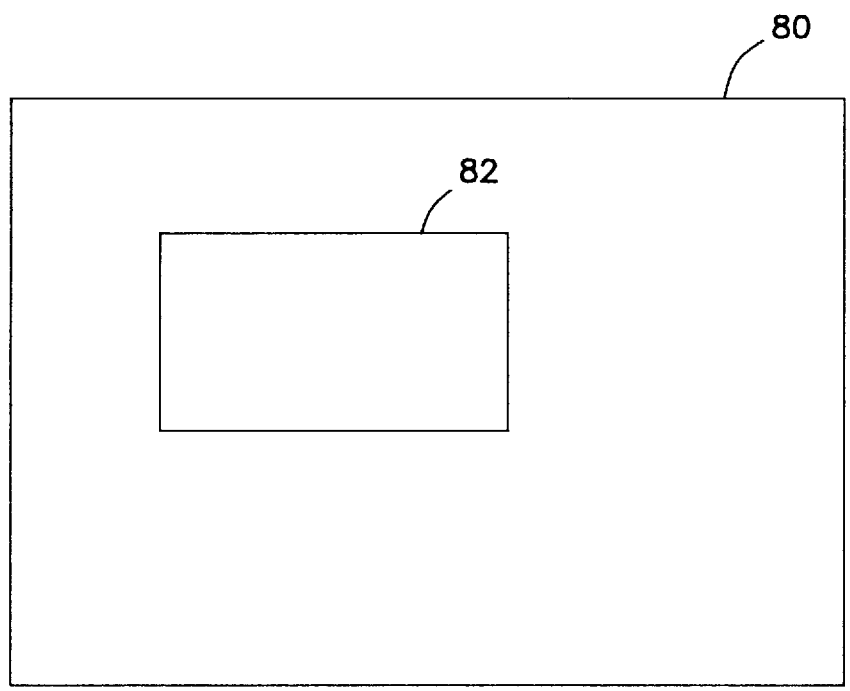
FIG. 6 is a representation of a secure window overlay according to the present invention.

As is shown in FIG. 6, while in trusted path mode, video manager 34 creates a trusted window 82 which is overlaid on the screen display 80 generated by workstation 40 for display 10. Since window 82 is created outside of workstation 40, by trusted elements, it is not possible for malicious software in workstation 40 to control any of the video in trusted window 82. In the preferred embodiment the size of trusted window 82 can vary; if sufficient video RAM is present, window 82 may be as large as the entire display screen.

In a like manner, while in trusted path mode, keyboard manager 36 intercepts keyboard data intended for workstation 40. The data is then routed to cryptographic entity 35, where it is encrypted before being passed over auxiliary port 42 to workstation processing unit 40. Thus, keyboard inputs are protected from eavesdropping and undetected modification until they are decrypted by cryptographic entity 69 on host computer 60.

In one embodiment of the trusted path subsystem of FIG. 3, cryptographic entity 35 uses a pair-wise key to encrypt data to be transmitted from keyboard 20 to host computer 60. At the same time, cryptographic entity 35 decrypts data transmitted from host computer 60 to display 10. The encryption and integrity mechanisms protect the data from eavesdropping and undetected modification as it is passed through workstation processor 40, network 50 and host computer untrusted subsystem 63. Other types of symmetric encryption algorithms such as the Data Encryption Standard (DES) and asymmetric cryptographic techniques such as public key can also be used. Furthermore, the encryption algorithm can either be implemented in software, programmable hardware, or custom hardware.

Trusted path mode can be invoked in a number of ways. In one embodiment, a switch on trusted path subsystem 30 can be used to manually activate trusted path mode. A second method would be to invoke trusted path mode by a combination of keys pressed simultaneously on keyboard 20 (like the control/alt/delete key sequence on a PC-compatible computer). A third embodiment would require that the user insert some sort of token device into subsystem 30. A token device might range from a smart card to a cryptoignition key. In the preferred embodiment, subsystem 30 would also have a feedback mechanism such as a light to notify the user that subsystem 30 was in trusted path mode.

The trusted path mode, used in conjunction with cryptographic entity 69 on host computer 60, provides security services such as user authentication, data confidentiality, data integrity and data origin authentication and confinement of malicious software. The user is authenticated to trusted path subsystem 30 and this authentication is securely passed to trusted subsystem 67 in MLS computer 60. Data passed between cryptographic entities 35 and 69 is protected from unauthorized disclosure and undetected modification. Cryptographic entities 35 and 69 also assure that the data was sent from one cryptographic entity to its peer cryptographic device. In addition, malicious software on workstation 40, network 50 or untrusted subsystem 63 is confined so that it cannot dupe the user or trusted subsystem 67 into performing an insecure action.

The user can be authenticated to the trusted computing system by either authenticating himself directly to trusted path subsystem 30 or by going through subsystem 30 to host computer 60. In the first method, the user can authenticate himself to subsystem 30 via such means as a personal identification number (PIN), a password, biometrics or a token device such as a smart card or a cryptographic ignition key. Once the user has authenticated himself to subsystem 30, subsystem 30 relays the authentication to trusted subsystem 67. The step of relaying authentication can be done by either automatically entering trusted path mode as part of the authentication process or by having subsystem 30 relay the authentication data at a later time.

A second method for authenticating a user would be to first enter trusted path mode and then authenticate the user directly to host computer 60. This approach would reduce the processing power needed on subsystem 30.

In its simplest form, trusted path subsystem 30, in conjunction with workstation 40, display 10 and keyboard 20, forms an assured terminal. Data typed on keyboard 20 or extracted from a pointing device such as a mouse is encrypted and transferred over network 50 to host computer 60. Screen display data transferred from host computer 60 is decrypted and displayed within trusted window 82. Such a terminal might be implemented as a relatively dumb terminal such as a VT100, or it could be implemented as a X Windows terminal. The X Window embodiment would be useful since it would allow the creation of multiple trusted windows 82 and would permit the assigning of a different security level to each window. Such a mechanism would permit qualified users to cut information from a document of one sensitivity and paste it into a document of a different sensitivity.

An assured terminal is especially useful in an environment where you are trying to maintain a number of security levels despite having a workstation which will only operate at one level. An example is a trusted computing system mixing single level secure workstations with a multi-level computer with three security levels: unclassified (least sensitive), secret (much more sensitive), and top secret (most sensitive). Trusted path subsystem 30 can be used to expand the capabilities of the single level workstation since subsystem 30 allows the user to essentially disable subsystem 30, do all his work at the level permitted by the workstation (say, secret) using all the capabilities of his workstation and whatever facilities are available on the multilevel computer. Then, if the user has a small amount of work that he or she needs to do at top secret, the user can invoke trusted mode in subsystem 30, isolate their workstation, its processor memory and storage devices, and he has, in effect, a keyboard and a terminal connected to a secure communications device through a multilevel host. The user can then do the operations required at top secret.

The cryptographic techniques applied in subsystem 30 will ensure that none of the top secret information going to or from the multilevel secure computer is linked to files within workstation 40 or is captured and copied on the network.

Likewise, if a user had to do a small amount of unclassified work, he could put the workstation into trusted path mode using subsystem 30. The user could, through a trusted path, invoke an unclassified level and again the cryptographic techniques applied at each end of the link would prevent secret information from being mixed in with the unclassified information. The system essentially provides a pipe to keep data from one security level from being mixed into data at a different security level.

Trusted subsystem 30 is not, however, limited to a role as an assured terminal. In a file server application, files stored at host computer 60 or within workstation 40 could be transferred to subsystem 30 for data processing tasks such as editing, reviewing the file or transferring it as electronic mail. In a client server application, processor 31 could execute one or more client processes such as an editor or a communications process. Software and firmware which could be implemented inside trusted path subsystem 30 would be limited only by the amount of storage within subsystem 30 and the review and approval process required to provide clean software.

Trusted path subsystem 30 has access not only to files on host computer 60 but also on workstation 40. Files transferred from either computer 60 or workstation 40 can be manipulated and transferred to other computers or workstations.. For example, a secure electronic mail system could be implemented in which trusted path subsystem 30 is used for reviewing, reclassifying, and electronically signing messages. A document file from computer 60 or workstation 40 can be displayed and reviewed. If appropriate, the user may downgrade its sensitivity level by attaching a different security level to the document. The finished file can then be sent via electronic mail to other users.

In one embodiment of such an electronic mail function, subsystem 30 would go out on the network to the directory server to retrieve the names, electronic mail addresses and public key information of the intended recipients. The directory server could be implemented as either a trusted or an untrusted process on host computer 60 or on another network computer. Subsystem 30 would then attach the addresses to the file, affix a digital signature, encrypt the final product and send it through host computer 60 to the designated addresses.

In another embodiment of such a function, in a system without a MLS computer, secure electronic mail is possible by first establishing a trusted path from the user to processor 31. The user then accesses files of workstation 40 (or on other network computers), displays and reviews the file, accesses an unsecured directory server to retrieve the names, electronic mail addresses and public key information and sends the encrypted message via electronic mail to its recipient.

Processor 31 can also be used to control video manager 34 in order to implement and control the user interface. Such an approach would permit the use of a graphical user interface (GUI) within trusted window 82 that would reduce the amount of screen information transferred by host computer 60. This approach also permits the user to implement, through processor 31, multiple trusted windows 82 at the user node in order to perform the cut-and-paste function referred to above.

In the preferred embodiment, subsystem 30 is a modular design in which processor 31 and cryptographic entity 35 are kept constant and video manager 34 and keyboard manager 36 are designed so that they can be replaced easily to handle different displays and keyboards. In one embodiment, subsystem 30 is designed to be portable. A portable subsystem 30 can be used to turn any modem equipped computer with the requisite auxiliary data port into a secure data terminal or computer.

Figure 4:
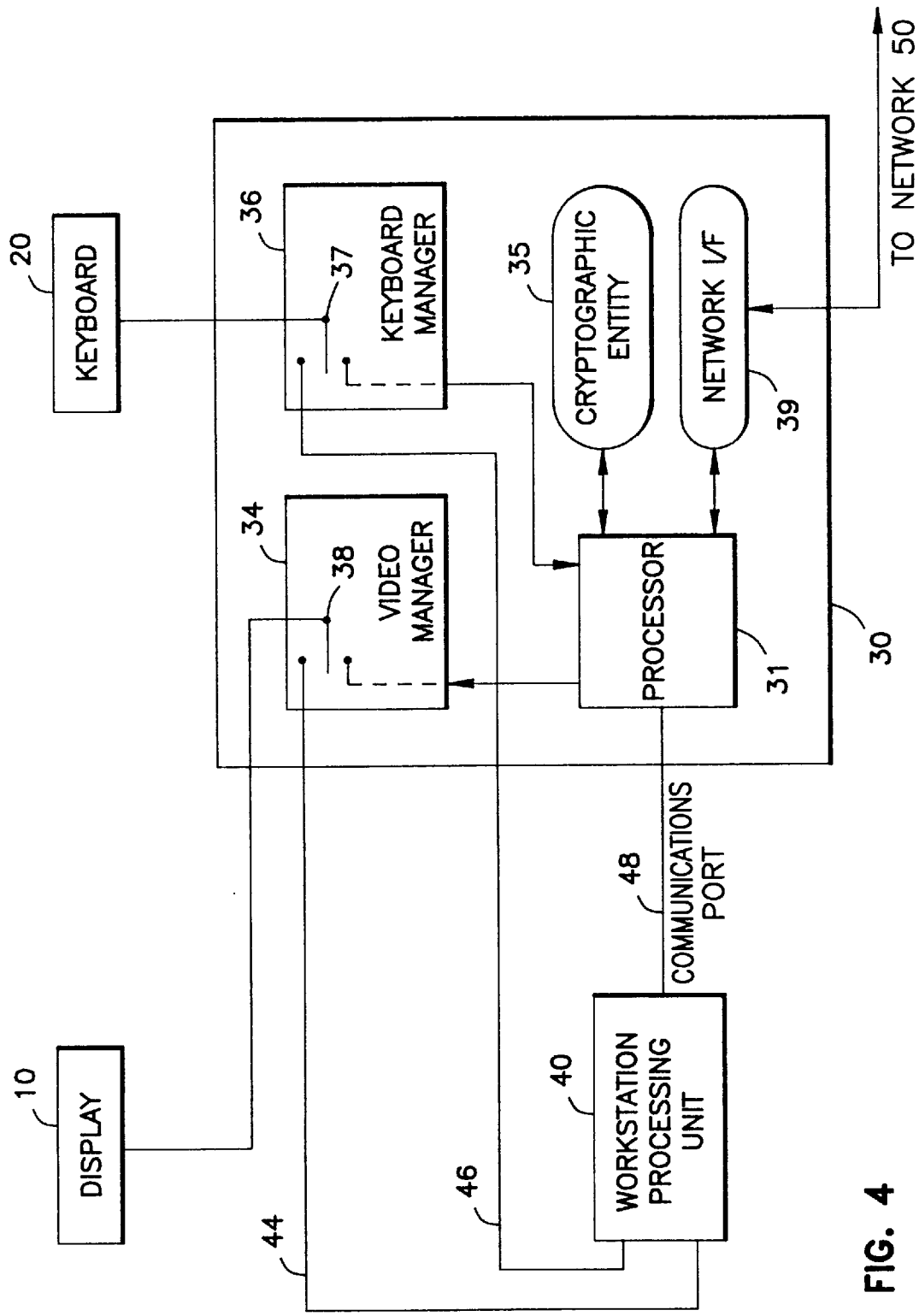
FIG. 4 is a block diagram representation of a user node including a different embodiment of a trusted path subsystem according to the present invention.

FIG. 4 is a block diagram representation of an alternate embodiment of trusted path subsystem 30. In FIG. 4, processor 31 is connected through network interface 39 to network 50 and through communication port 48 to workstation 40. In the embodiment shown in FIG. 4, workstation processing unit 40 is isolated from the network. This approach allows the encryption of all network traffic associated with the user node. In the embodiment shown in FIG. 4, communication port 48 can be a communication medium ranging from RS232 to an unsecured Ethernet.

Figure 5:
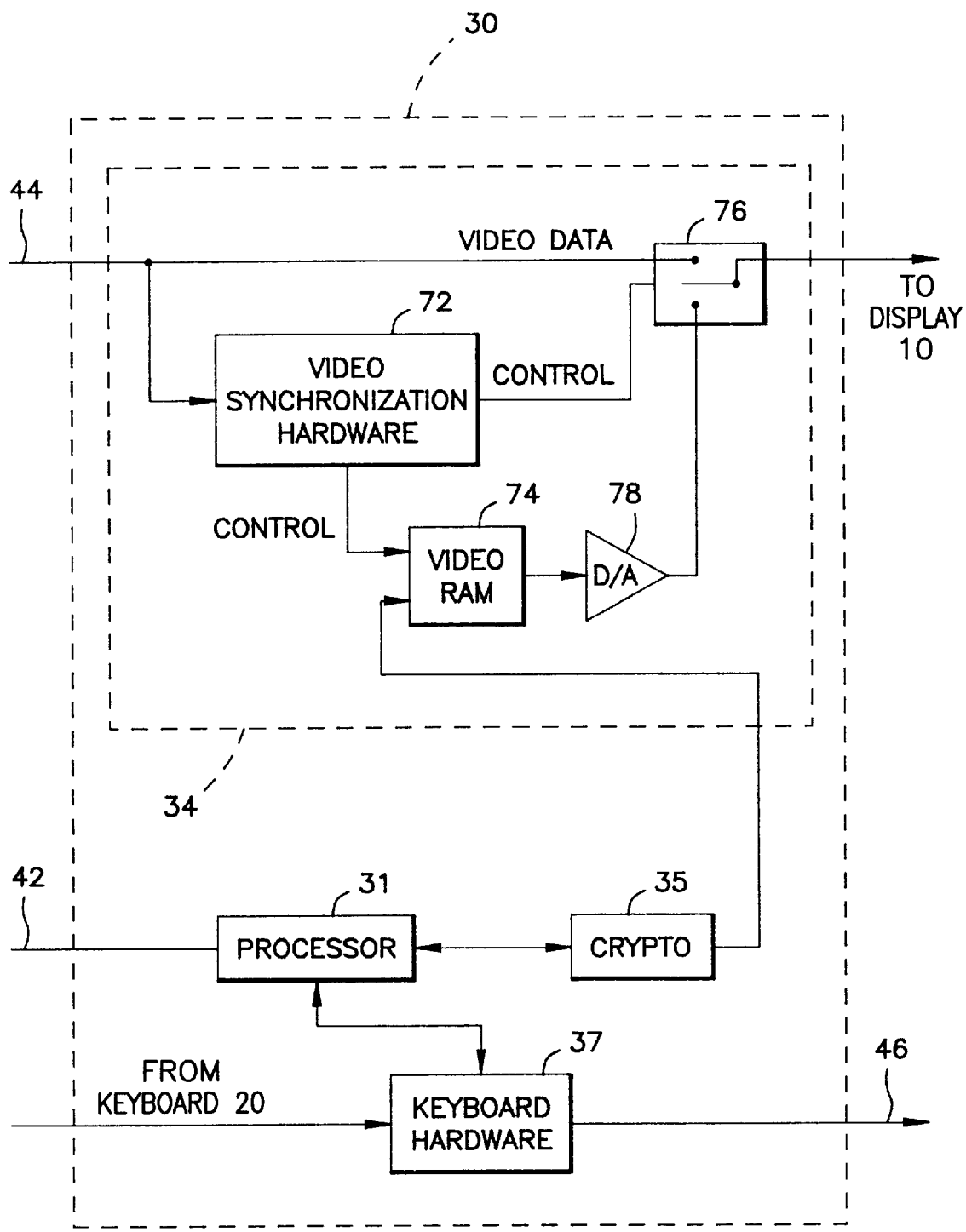
FIG. 5 is an electrical block diagram representation of one embodiment of the trusted path subsystem according to the present invention.

A more detailed representation of one embodiment of trusted path subsystem 30 is shown in FIG. 5. In FIG. 5, keyboard logical switch 37 receives data from keyboard 20 and routes it to processor 31. During normal mode, processor 31 then sends the received keyboard data directly over keyboard port 46 to workstation 40.

In contrast, in trusted path mode, processor 31 captures the received keyboard data and sends it to cryptographic entity 35 for encrypting. No information is sent over keyboard port 46 to workstation 40. The resulting encrypted keyboard data is instead sent through auxiliary data port 42 to workstation 40 and from there to computer 60.

Video data from workstation 40 is transmitted from video port 44 to video manager 34. During normal mode, the video data is sent through to display 10 without modification. During trusted path mode, however, the video data transferred from video port 44 is overlaid, at least in some part, by video data generated by video manager 34.

A representative video manager 34 is shown generally in FIG. 5. Video manager 34 consists of video synchronization hardware 72, video RAM 74, video driver 78 and video multiplexer 76. Video synchronization hardware 72 receives synchronization signals from video port 44 and uses the signals to coordinate the display of data from video RAM 74 with the display generated by workstation 40. During normal mode data from video RAM 74 is not used; video is transferred directly from workstation 40 through video multiplexer 76 to display 10. When, however, trusted path subsystem 30 is placed into trusted path mode, video data stored in video RAM 74 is used instead of the normal video stream to create trusted window 82.

In one embodiment synchronization hardware 72 uses the synchronization signals received from workstation 40 to control the reading of data from video RAM 74 and the conversion of that data into a video signal by video driver

78. The output of video driver 78 is then used to drive video multiplexer 76. Synchronization hardware 72 controls video multiplexer 76 in order to switch between the video generated by workstation 40 and the video being read from video RAM 74. The output of video multiplexer 76 is driven through video amplifiers to display 10.

The design of the video hardware needed to overlay one display on top of another is well known in the art. Window 82 can be synched up to the video going to display 10. Typically, if window 82 is not full screen, video synchronization hardware 72 counts the number of lines to the first line of window 82, counts in the number of pixels, and inserts the video at that point. Trusted path video data is then written for the desired number of pixels and video multiplexer 76 is switched back to normal video for the remainder of the video line. This mechanism provides flexibility in placement and sizing of window 82 on screen 80.

Video multiplexer 76 can be built using a crosspoint video switch such as the MAX456 manufactured by Maxim Integrated Products. Video data to and from the crosspoint video switch can be buffered using the MAX457 by Maxim Integrated Products. Video RAM 74 can be any commercial video RAM. A typical video RAM is the MT42C8256 manufactured by Micron Technologies Inc. It should be obvious that the given design can be easily adapted for either a color or a black and white display or even for a black and white overlay of a color display.

In one embodiment, host computer 60 transmits, as encrypted packets, video data to be displayed within trusted window 82. The encrypted packets are passed to processor 31 by workstation 40 and then on to encryption device 35. Encryption entity 35 decrypts the video data and places it into video RAM 74. Synchronization hardware 72 then activates video multiplexer 76 and video RAM 74 in order to display the decrypted secure video data.

In a second embodiment (not shown), processor 31 creates the video overlay data and writes that data to video RAM 74. Display of the data is as above.

A trusted computing system based on unsecured, commercially available, workstations, trusted path subsystems and multilevel secure computers provides a powerful, highly secure computing environment. The ability of such a system to compensate for unsecured workstations allows the designers of such systems to use the latest versions of commercially available hardware and software without compromising the security of the system.

For instance, a user of a workstation may wish to edit a secret document and reclassify the edited document as unclassified. The document can be loaded into the workstation, edited with the user's favorite word processing software package, and saved. Then, in order to classify the document as unclassified, the user would invoke trusted path mode, the trusted window would be displayed and the user could review the revised document to verify that no additional information had been attached to the file. The reviewed document could then be released as an unclassified document and the user would then returns to normal mode.

The unique placement of cryptographic entity 35 relative to workstation 40 allows a single workstation to be used at different levels of security sensitivity. Therefore, instead of systems in which a workstation is required for each level of security sensitivity, in the present system a single commercial workstation may be used to protect and access a range of security levels.

Finally, the end-to-end characteristic of the encryption permits secure communication without the need to perform costly analysis of complex elements such as network controllers. The invention also allows use of commercial off-the-shelf workstations and network components and can be used with a variety of keyboards and displays.

Although the present invention has been described with reference to the preferred embodiments, those skilled in the art will recognize that changes may be made in form and detail without departing from the spirit and scope of the invention.

What is claimed is:

1. A trusted path subsystem comprising:
   a processor, wherein the processor includes a communications port;
   an input data manager connected to the processor, wherein the input data manager includes an input data switch;
   a display manager connected to the processor, wherein the display manager includes a display switch;
   wherein the input data switch operates in trusted path mode to intercept data received by the input data manager and transfer the intercepted data to the processor;
   wherein the processor operates in trusted path mode to encrypt the intercepted data and transfer the encrypted intercepted data to the communications port; and
   wherein the display switch operates in trusted path mode to modify display information transferred by the display manager as a function of display information created by the processor.

2. The trusted path subsystem according to claim 1 wherein the processor further includes a cryptographic entity used to selectively encrypt and decrypt data.

3. The trusted path subsystem according to claim 1 wherein the subsystem further includes a network interface.

4. The trusted path subsystem according to claim 1 wherein the input data switch comprises keyboard manager logic.

5. The trusted path subsystem according to claim 1 wherein the display switch includes:
   a video multiplexer having first and second video multiplexer input ports and a video multiplexer output port, wherein the video multiplexer output port generates an output video signal used to drive a video display;
   a video data memory;
   converter means, connected to the video data memory and the second video multiplexer input port, for converting data read from said video data memory into a trusted video signal representative of that data and for applying the trusted video signal to the second video multiplexer input port; and
   a video synchronization circuit, connected to the video data memory and the video multiplexer, for controlling the video data memory and the video multiplexer.

6. The trusted path subsystem according to claim 5 wherein the input data switch comprises keyboard manager logic.

7. The trusted path subsystem according to claim 5 wherein the video synchronization circuit includes means for inserting a trusted window overlay into a video signal received at the first video multiplexer input port.

8. The trusted path subsystem according to claim 7 herein the input data switch comprises keyboard manager logic.

9. A trusted path subsystem comprising:
   a processor, wherein the processor includes a communications port;

an input data manager connected to the processor, wherein the input data manager includes a data input port, a data output port and an input data switch, wherein the input data switch is connected to the processor, the data input port and the data output port;

a display manager connected to the processor, wherein the display manager includes a display input port, a display output port and a display switch, wherein the display switch is connected to the processor, the display input port and the display output port;

wherein the input data switch operates in normal mode to transfer data received at the data input port to the data output port and in trusted path mode to intercept the data received at the data input port and transfer the intercepted data to the processor;

wherein the processor operates in trusted path mode to encrypt the intercepted data and transfer the encrypted intercepted data to the communications port; and wherein the display switch operates in normal mode to transfer display information received at the display input port to the display output port and in trusted path mode to modify the display information received at the data input port as a function of display information received from the processor.

10. The trusted path subsystem according to claim 9 wherein the processor further includes a cryptographic entity used to selectively encrypt and decrypt data.

11. The trusted path subsystem according to claim 9 wherein the subsystem further includes a network interface.

12. The trusted path subsystem according to claim 9 wherein the input data switch comprises keyboard manager logic.

13. The trusted path subsystem according to claim 9 wherein the display switch includes:

a video multiplexer having first and second video multiplexer input ports and a video multiplexer output port, wherein the first video multiplexer input port receives a video signal from the display input port and wherein the video multiplexer output port generates an output video signal used to drive a video display;

a video data memory;

converter means, connected to the video data memory and the second video multiplexer input port, for converting data read from said video data memory into a trusted video signal representative of that data and for applying the trusted video signal to the second video multiplexer input port; and a video synchronization circuit, connected to the video data memory and the video multiplexer, for controlling the video data memory and the video multiplexer so as to insert the trusted video signal into the output video signal generated at the video multiplexer output port.

14. The trusted path subsystem according to claim 13 wherein the input data switch comprises keyboard manager logic.

* * * * *